United States Patent [19]

Isensee et al.

[11] Patent Number: 5,550,559
[45] Date of Patent: Aug. 27, 1996

[54] METHOD AND APPARATUS FOR LOCATING A POINT IN A LIST

[75] Inventors: Scott H. Isensee, Georgetown; Ricky L. Poston, Austin, both of Tex.

[73] Assignee: International Business Machines Corporation, Armonk, N.Y.

[21] Appl. No.: 247,838

[22] Filed: May 23, 1994

[51] Int. Cl.⁶ ................................................. G09G 5/34
[52] U.S. Cl. ................................. 345/124; 345/123
[58] Field of Search ................................. 395/159, 160, 395/157; 345/121, 141, 123, 124, 125

[56] References Cited

U.S. PATENT DOCUMENTS

| | | | |
|---|---|---|---|
| R. i34,422 | 10/1993 | Aihara | 345/141 |
| 4,947,370 | 8/1990 | Sugitani | 345/124 |
| 5,140,678 | 8/1992 | Torres | 395/159 |
| 5,202,828 | 4/1993 | Vertelney et al. | 395/159 |
| 5,339,391 | 8/1994 | Wroblewski et al. | |

OTHER PUBLICATIONS

Microsoft Window User's guide, 1985, p. 117.
Animation Works, Gold Disk Inc., 1991, Ref 3:15.

Primary Examiner—Curtis Kuntz
Assistant Examiner—Vivian W. Chang
Attorney, Agent, or Firm—Diana L. Roberts

[57] ABSTRACT

A method and apparatus for locating a point in a list are provided. The method includes the steps of indexing the list into segments, placing the segments into a viewer on a display, and selecting a desired segment from the viewer to scroll the list to the desired segment. The method may be integrated into a graphical user interface.

11 Claims, 4 Drawing Sheets

METHOD AND APPARATUS FOR LOCATING A POINT IN A LIST

BACKGROUND OF THE INVENTION

1. Field of the Invention

The present invention relates to graphical user interfaces and, more particularly, to a method and apparatus for locating a desired point in a list.

2. Background Information and Description of Related Art

Graphical user interfaces ("GUIs") typically utilize scroll bars to scroll through a list which is too large to be displayed on a display window. Further, a slider moves along the scroll bar to give the user information regarding the size of the list and the current position within the list.

FIG. 1 is a pictorial view of a display window controlled by a conventional GUI. The display window displays a list of icons 130 and scroll bar 100. Scroll bar 100 is positioned on the right side of the display window. As shown, the GUI alphabetizes the labels (i.e. names) of icons 130.

The list of icons 130 is too large to be entirely viewed on the display window. Therefore, the user can click a pointing device, such as a mouse (not shown), over arrow sections 110 or 120 of scroll bar 100 to scroll the list upward or downward, as appropriate.

If, however, the file is extremely large, the user may have to click arrows 110 or 120 numerous times to find a desired point within the list. This process can be tedious and time consuming. Therefore, there is great demand for a technique which speeds searches through lists, especially large lists. Such a technique should make the graphical user interface more user friendly and more efficient.

SUMMARY OF THE INVENTION

The present invention is a method and apparatus for locating a point in a list. The method includes steps for controlling a computer, having at least a display device, to locate the point in the list. Specifically, the method includes the steps of indexing the list into segments, placing the segments into a viewer on the display device, and selecting a desired segment from the viewer to scroll the list to the desired segment.

The apparatus for locating the point in the list includes a display device for displaying the list, a processor, means for controlling the processor to index the list into segments, a viewer on the display device for displaying the segments, and means for controlling the processor to select a desired segment from the viewer to scroll the list to the desired segment.

DETAILED DESCRIPTION OF THE PREFERRED EMBODIMENTS

An exemplary embodiment includes an apparatus and method for locating a point within a list. The exemplary embodiment is preferably practiced in a suitable representative hardware configuration, such as the hardware configuration illustrated in FIG. 2.

Figure 1:
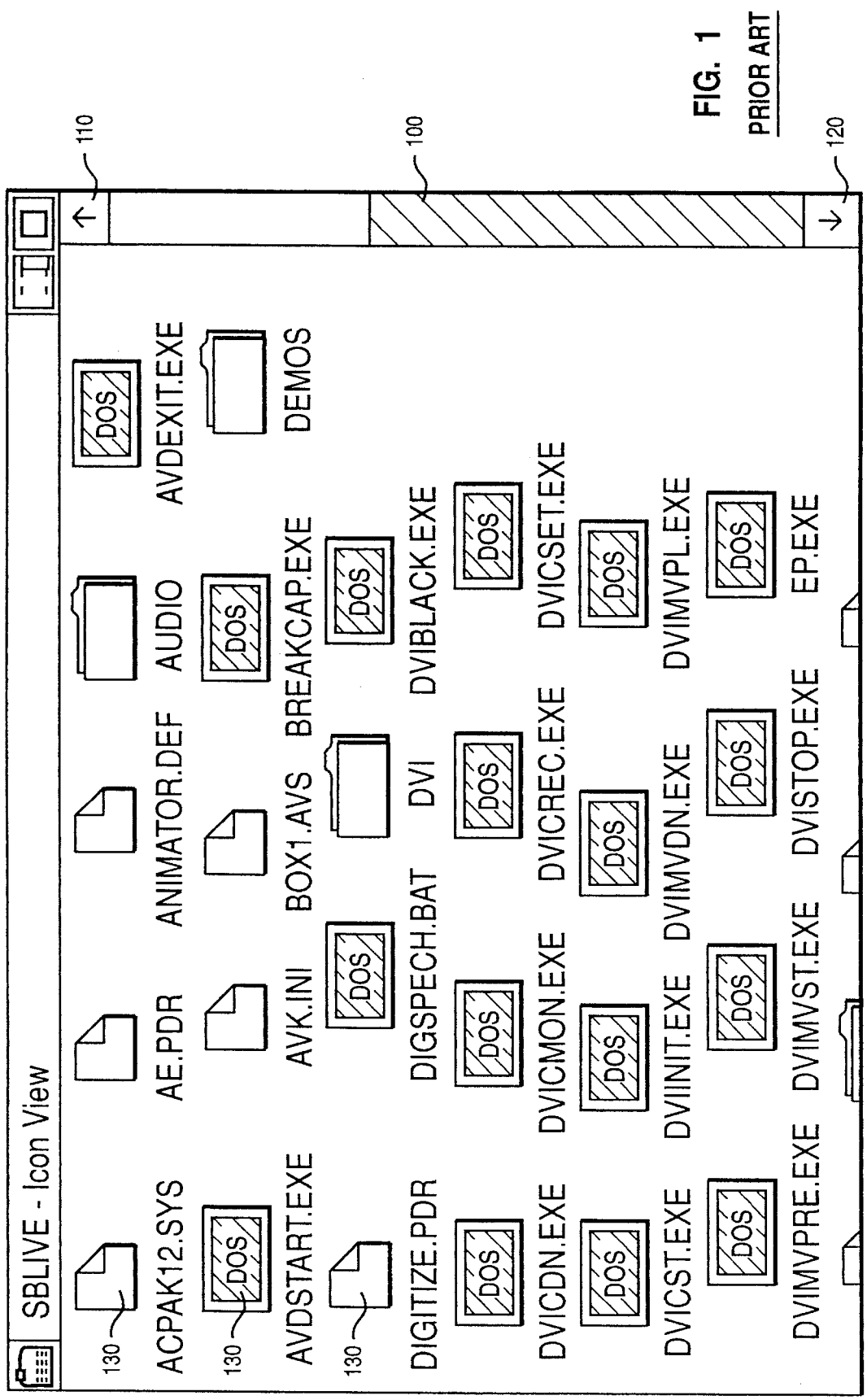
FIG. 1 illustrates a pictorial view of a display window having a prior art scroll bar.
Figure 2:
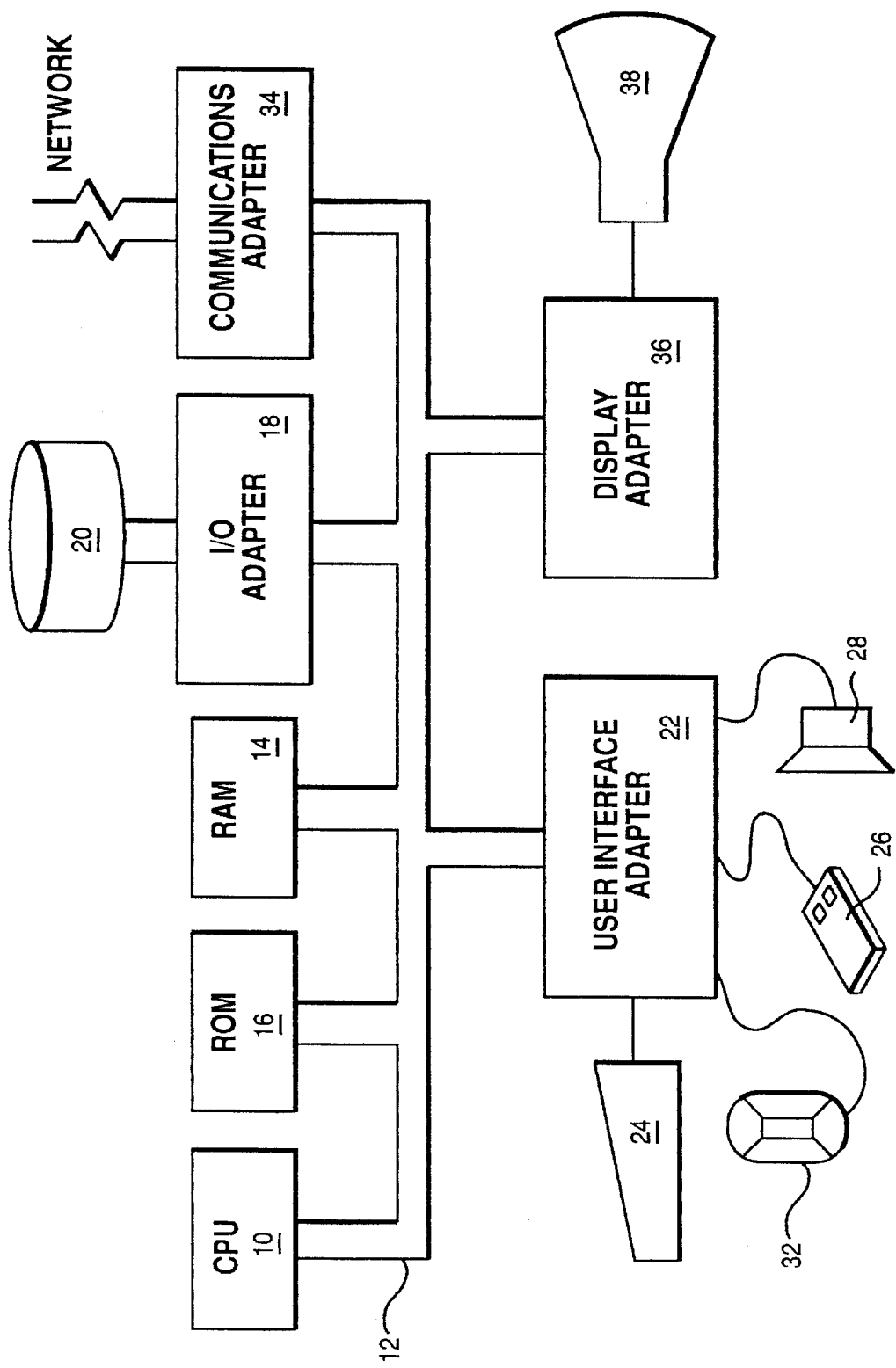
FIG. 2 illustrates a representative hardware environment in accordance with the present invention.

Referring to FIG. 2, workstation 200 includes any suitable central processing unit 210, such as a conventional microprocessor, and a number of other units interconnected via system bus 212. Illustratively, workstation 200 includes random access memory ("RAM") 214, read only memory ("ROM") 216, display adapter 236 for connecting system bus 212 to display device 238, and I/O adapter 218 for connecting peripheral devices (e.g. disk and tape drives 220) to system bus 212. Workstation 200 further includes user interface adapter 222 for connecting keyboard 224, mouse 226, speaker 228, microphone 232, and/or other user interface devices, such as a touch screen device (not shown), to system bus 212. Communication adapter 234 connects workstation 200 to a data processing network.

The exemplary embodiment also includes a graphical user interface ("GUI") (e.g. control element) which resides within a machine-readable media to direct the operation of workstation 200. Any suitable machine-readable media may retain the GUI, such as RAM 214, ROM 216, a magnetic diskette, magnetic tape, or optical disk (the last three being located in disk and tape drives 220).

The user locates specific points within the list using the GUI. The GUI directs CPU 210 to locate the specific points within the list. To do this, the GUI generates an indexed vertical scroll bar. However, one skilled in the art will readily recognize that the GUI could generate other types of viewers to implement the exemplary embodiment, such as, for example, an indexed horizontal scroll bar.

Figure 3:
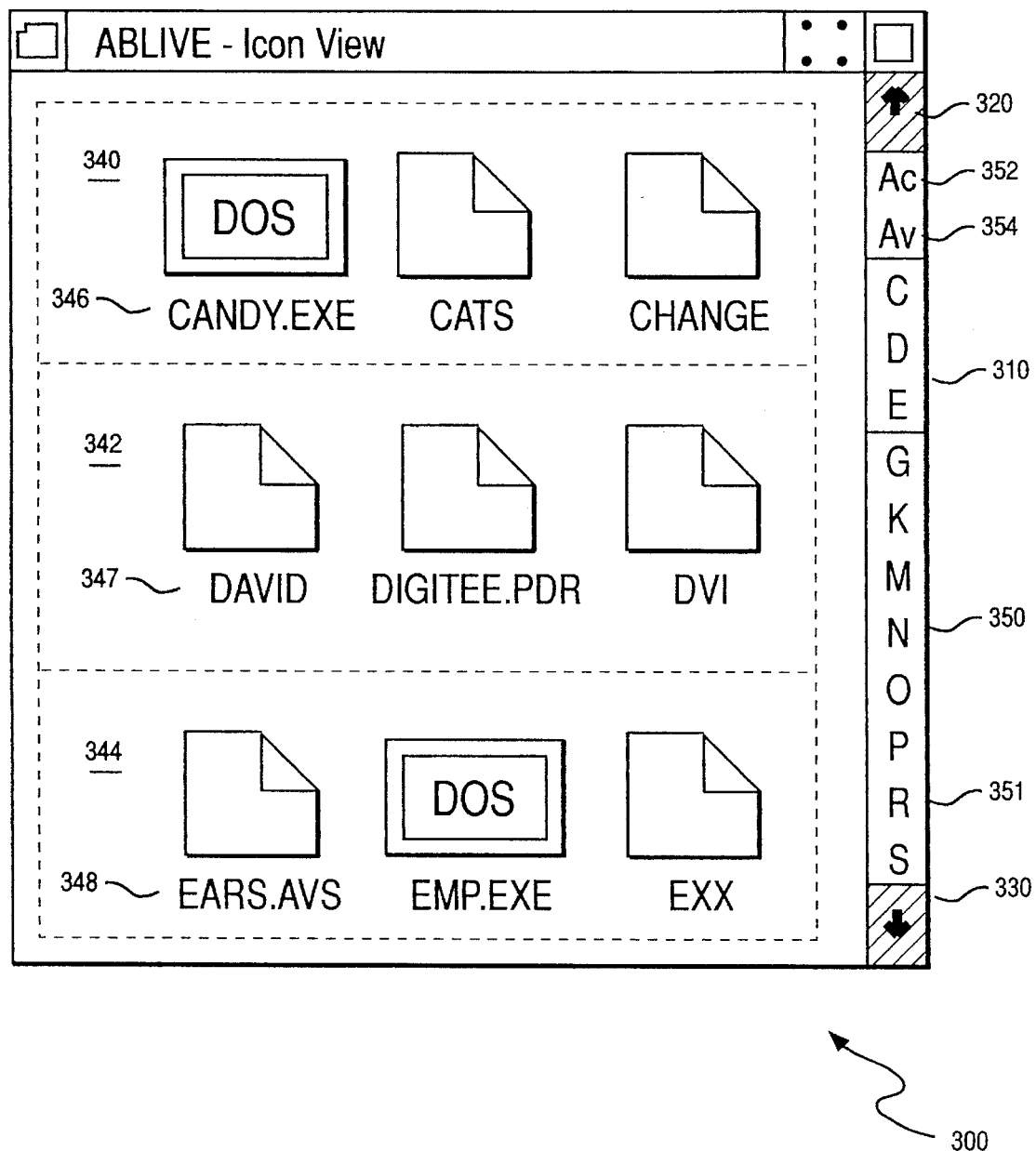
FIG. 3 illustrates a pictorial view of an indexed scroll bar in accordance with the present invention.

Referring to FIG. 3, window 300 may display various numbers of object rows. However, for sake of illustration, window 300 alphabetically displays three icon rows 340, 342, and 344. Window 300 also displays indexed scroll bar (herein "scroll bar") 350.

Scroll bar 350 includes up arrow 320, down arrow 330, internal region 351, and slider 310. The GUI positions indexing characters (e.g. 352 and 354) within the internal region of scroll bar 350. The user may position and click any suitable pointing device, such as a mouse, over up arrow 320 or down arrow 330 to scroll slider 310 up and down, respectively. The GUI sizes slider 310 according to the number of rows displayed on window 300. Therefore, in the present illustration, slider 310 encapsulates three rows of indexing characters on scroll bar 350.

Figure 4:
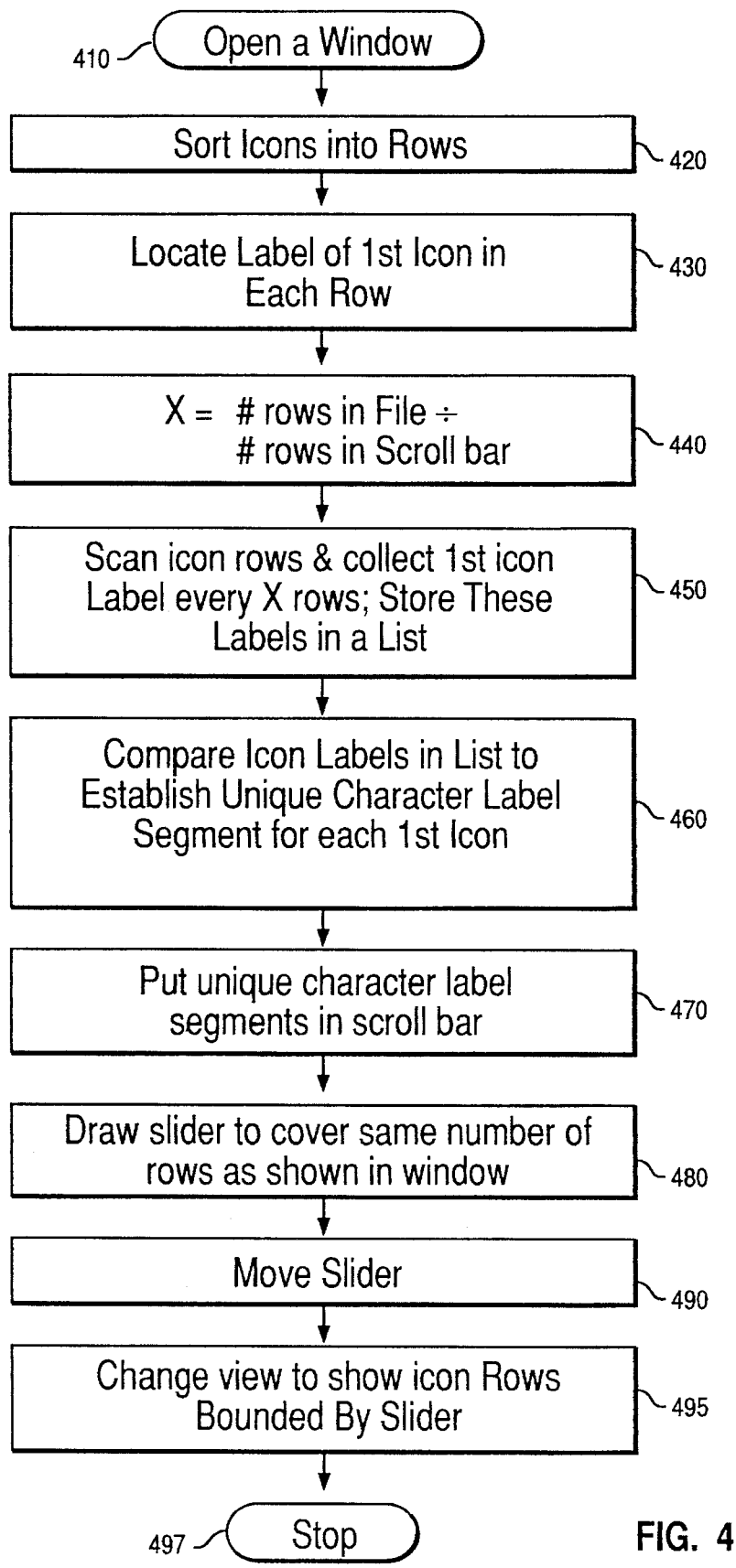
FIG. 4 is a flow chart of the logical flow in accordance with the present invention.

FIG. 4 illustrates a flow diagram of the GUI according to the exemplary embodiment. At 410, window 300, having multiple icons, is opened. At 420, the GUI alphabetically sorts those icons into rows 340, 342, 344, and other rows not shown on window 300. Next, at 430, the GUI locates the label of the first icon in each row (e.g. labels 346, 347, and 348 of FIG. 3) and stores those labels into an index (herein "label index").

Next, the GUI determines the number of rows in the list and divides that number by the number of rows available in scroll bar 350 (see FIG. 3). The GUI stores the resulting number (i.e. "X") in RAM 214 (see FIG. 2). At 450, the GUI scans down the label index and collects the label every X rows. Illustratively, if there are 50 rows in a list and 10 rows in scroll bar 350, the GUI collects the label from the label index every five rows (e.g. X=5).

Next, at 460, the GUI compares each collected label with the subsequently collected label to establish a unique character label segment for each X number of rows. For example, if the collected label in the first row and fifth row both begin with an "A", the GUI compares the second character of those labels, and so on, until it finds a different character. At 470, the GUI places the unique character label segment or string of character label segments within scroll bar 350.

For example, referring to FIG. 3, rows 352 and 354 illustrate first labels that both begin with an "A". Therefore, the GUI compared the second character of those labels to find a different character. Upon finding a different character, the GUI stored the first two characters of those labels into scroll bar 350.

The previously described procedures of alphabetically sorting icons into rows, locating the label of the first icon in each row, storing those labels into a label index, determining X, scanning down the label index and collecting the first label at every X rows, and comparing each collected label with the subsequently collected label to establish a unique character label segment for each X number of rows is collectively referred to as indexing the list.

Referring to FIGS. 3 and 4, at 480, the GUI creates slider 310 to encapsulate the same number of rows in scroll bar 350 as displayed on window 300. At 490, the user moves slider 310 and, in response, the GUI changes the view shown in window 300 to illustrate the rows encapsulated by slider 310 at 495.

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A method implemented by a computer system, having at least a display device, memory, and user controls, for scrolling a list of rows, having information therein, to a desired location, wherein at least a first portion of the list is displayed on the display device, comprising the steps of:

indexing said information in said list of rows to generate a unique label segment for each of a number of said rows, each of said unique label segments corresponding to one of said rows;

displaying said unique label segments in a viewer displayed on said display device; and in response to a selection of at least one of said unique label segments in said viewer using said user controls, wherein said corresponding row of said selected unique label segment is not displayed on said display device, scrolling said list to said corresponding row of said selected unique label segment.

2. The method according to claim 1 wherein said indexing step comprises the following steps:

alphabetically sorting a plurality of icons within said list into said rows;

locating a label for the first icon in each of said rows and storing said labels into a label index within said memory;

dividing the number of said rows in said list by the number of rows in said viewer to produce a resulting number X;

scanning down said label index and collecting said label every X rows; and comparing each of said collected labels with the subsequently collected label to establish said unique label segment for each of said X rows.

3. The method according to claim 2 wherein said displaying step comprises the step of:

positioning each of said unique label segments in a row within said viewer.

4. The method according to claim 3 wherein said scrolling step comprises the steps of:

in response to said user controls, positioning a slider over said selected unique label segment in said viewer; and in response to said user controls, activating said slider.

5. The method according to claim 4 wherein said slider encapsulates a number of said rows within said viewer that is substantially equivalent to the number of rows displayed on said display device.

6. An apparatus for scrolling a list of rows, having information therein, to locate a point in the list, comprising:

a display device for displaying at least a first portion of said list;

a processor;

means for controlling said processor to index said information in said list of rows to generate a unique label segment for each of a number of said rows, each of said unique label segments corresponding to one of said rows;

said display device for displaying said unique label segments in a displayed viewer;

user controls for selecting at least one of said unique label segments in said viewer; and in response to a selection using said user controls, wherein said corresponding row of said selected unique label segment is not displayed on said display device, means for scrolling said list to said corresponding row of said selected unique label segment.

7. The apparatus according to claim 6 wherein said means for controlling said processor to index said list comprises:

means for alphabetically sorting icons within said list into rows;

means for locating a label for the first icon in each of said rows and storing said labels into a label index;

means for dividing the number of said rows in said list by the number of rows in said viewer to produce a resulting number X;

means for scanning down said label index and collecting said label every X rows; and means for comparing each of said collected labels with the subsequently collected label to establish said unique label segment for each of said X rows.

8. The apparatus according to claim 6 wherein said viewer comprises:

each of said segments positioned in rows within said viewer.

9. The apparatus according to claim 8 wherein said selecting means comprises:

a slider positioned over said select unique label segment on said viewer; and said user controls for activating said slider.

10. The apparatus according to claim 9 wherein said user controls comprise a mouse.

11. The apparatus according to claim 9 wherein said slider encapsulates a number of said rows within said viewer that is substantially equivalent to the number of rows displayed on said display device.

* * * * *

UNITED STATES PATENT AND TRADEMARK OFFICE
CERTIFICATE OF CORRECTION

PATENT NO. : 5,550,559
DATED : August 27, 1996
INVENTOR(S) : Scott H. Isensee et al It is certified that error appears in the above-indentified patent and that said Letters Patent is hereby corrected as shown below:

Col. 4, line 37, after "sorting" insert --a plurality of--.

Signed and Sealed this

Eleventh Day of March, 1997

Attest:

BRUCE LEHMAN

*Attesting Officer*     *Commissioner of Patents and Trademarks*